United States Patent [19]

Taylor

[11] Patent Number: 5,033,683
[45] Date of Patent: Jul. 23, 1991

[54] DEVICE FOR PEELING AND CHOPPING BALES

[75] Inventor: Robert W. Taylor, Cohuna Victoria, Australia

[73] Assignee: Underhaug, Naerbo, Norway

[21] Appl. No.: 281,705

[22] PCT Filed: Mar. 6, 1987

[86] PCT No.: PCT/AU87/00065
§ 371 Date: Sep. 6, 1988
§ 102(e) Date: Sep. 6, 1988

[87] PCT Pub. No.: WO87/05186
PCT Pub. Date: Sep. 11, 1987

[30] Foreign Application Priority Data

Mar. 6, 1986 [AU] Australia ............................. PH4902

[51] Int. Cl.[5] ........................................... B02C 19/12
[52] U.S. Cl. ............................ 241/101 A; 241/186.4; 241/243; 241/292.1
[58] Field of Search ..................... 241/292.1, 243, 242, 241/223, 190, 189 R, 186.4, 186 R, 101 A, 101.7, 36

[56] References Cited

U.S. PATENT DOCUMENTS

| | | |
|---|---|---|
| 3,208,491 | 9/1965 | Bliss . |
| 4,524,916 | 6/1985 | Keyes et al. ..................... 241/101 A |

FOREIGN PATENT DOCUMENTS

| | | |
|---|---|---|
| 77913 | 8/1976 | Australia . |
| 134212 | 10/1976 | Denmark . |
| 2749256 | 10/1978 | Fed. Rep. of Germany ... 241/101 A |
| 2522472 | 9/1983 | France . |
| 2101882 | 1/1983 | United Kingdom ........... 241/101 A |

*Primary Examiner*—Mark Rosenbaum
*Attorney, Agent, or Firm*—Merchant & Gould

[57] ABSTRACT

A device for chopping bales includes a rotary cutter device (20) mounted for rotation about a substantially horizontal axis. A tumble mechanism (4) supports a bale with its lower part adjacent the cutter device (20) and tumbles or rotates the bale such that an outer layer is removed from the bale and is fed to the cutter device to be comminuted thereby and discharged by the rotation of the cutter device (20). Means (50) is provided to move the bale periodically further away from the cutter device (20).

14 Claims, 4 Drawing Sheets

DEVICE FOR PEELING AND CHOPPING BALES

The present invention relates to a device for chopping bales, especially round bales.

Conventionally, hay or other fodder in a round bale is removed by peeling the outer layer from the bale and discharging the fodder directly for use. Fodder in this form consists of relatively long stems which is not satisfactory for all uses. It has been proposed to comminute the fodder directly after removal from the bale by feeding the fodder through a rotary cutter assembly. However, previous attempts to achieve comminution directly after removal from the bale have been unsatisfactory in that substantial power input is required to drive the cutter assembly. There is also a tendency for the fodder to remain in contact with the cutter assembly for such a period that it is comminuted into particles of too small a size.

According to the present invention, there is provided a device for chopping bales, comprising rotary cutter means mounted for rotation about a substantially horizontal axis, means for supporting a bale with the lower part of the bale adjacent the cutter means and for tumbling or rotating the bale such that an outer layer is removed from the bale and is fed to the cutter means to be comminuted by the cutter means and discharged by the rotation of the cutter means, and means operative to move the bale periodically further away from the cutter means.

Preferably, the supporting means is adapted to support a round bale with its axis substantially horizontal and to rotate the bale about said axis.

Further according to the present invention, there is provided a device for chopping round bales comprising rotary cutter means having cutting elements spaced in the direction of its axis of rotation, means for supporting and rotating a bale about an axis substantially parallel to that of the cutter means and to bias the bale towards the cutter means whereby to separate an outer layer from the bale and feed it to the cutter means, said cutter means when rotating inducing an air flow to draw matter removed from the bale into a zone of action of the cutter means for comminution and for subsequent discharge, and means for periodically moving the bale away from the cutter means to enhance the airflow.

An embodiment of the invention will now be described by way of example only with reference to the drawings in which.

Figure 1:
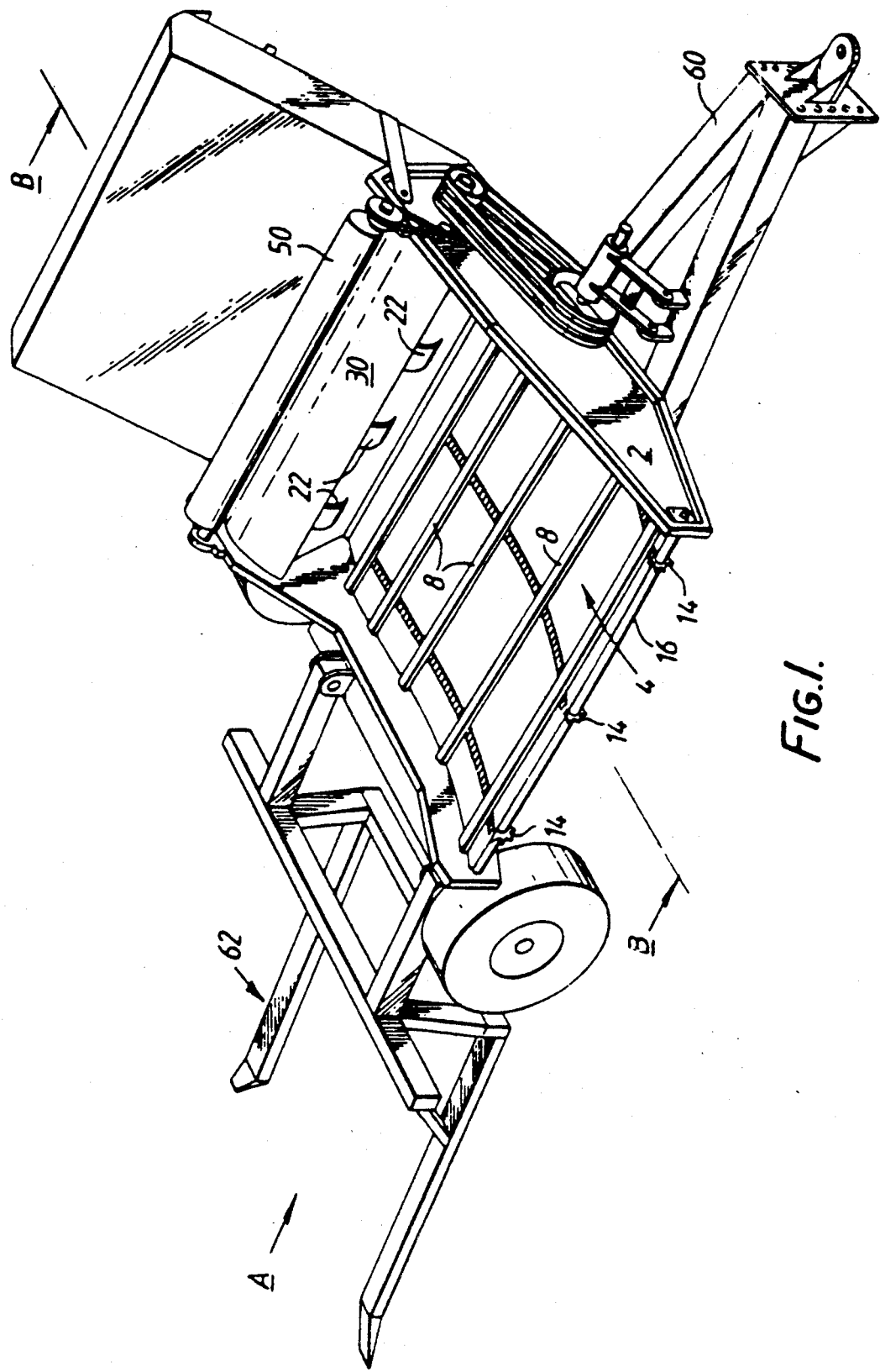
FIG. 1 is a perspective view of a bale peeling and chopping device in accordance with a preferred embodiment of the invention.

As shown in the drawings, a device for peeling and chopping round bales comprises an elevated bale supporting structure comprising opposed side walls 2 and a bale support surface 4 extending between the side walls and inclined downwardly from one end to an opposing end. The inclined bale support surface is defined by an endless conveyor comprising conveyor chains 6 having flights 8 of bar-like form and which extend between the side walls 2. The conveyor chains are entrained around driving sprockets 10 on a driving shaft 12 and sprockets 14 on an idle shaft 16.

Immediately downstream of the lower end of the conveyor 4 is a cutter drum 20 which extends the width of the conveyor. The cutter drum 20 is mounted for rotation about a horizontal axis parallel with that of the driving and idle shafts 12, 16 and carries flail blades 22 arranged at intervals along the length of the drum. Adjacent blades are equi-angularly spaced around the axis of the drum. As shown, the drum has four such blades arranged along its length, adjacent blades being angularly spaced by 90°. Each blade 22 is pivotally mounted on the drum about an shaft 24 parallel to that of the drum and rotation of the drum causes the blades to swing outwardly, as shown in FIG. 3.

Figure 3:
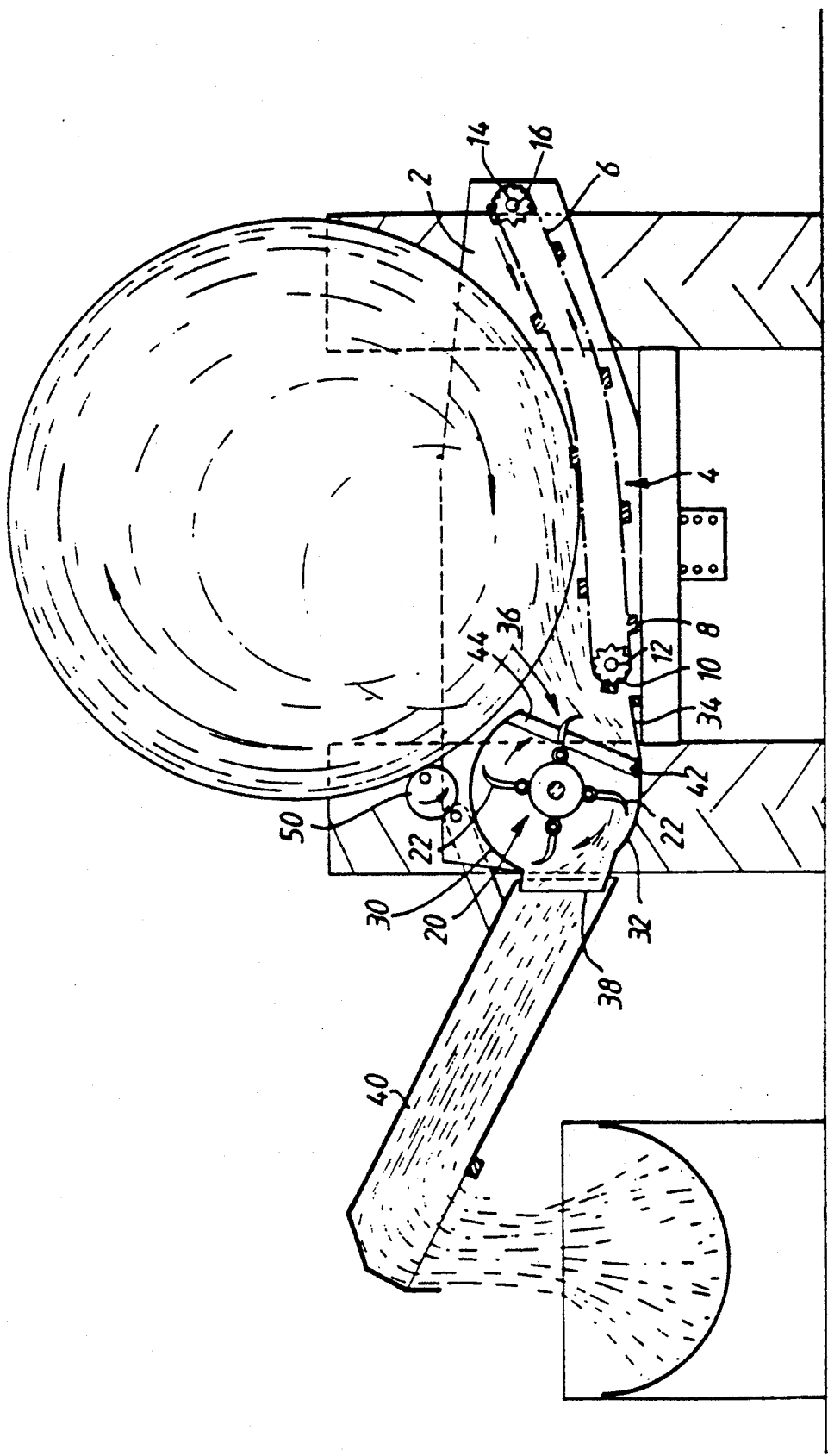
FIG. 3 is a schematic transverse section along line B—B of FIG. 1.
Figure 4:
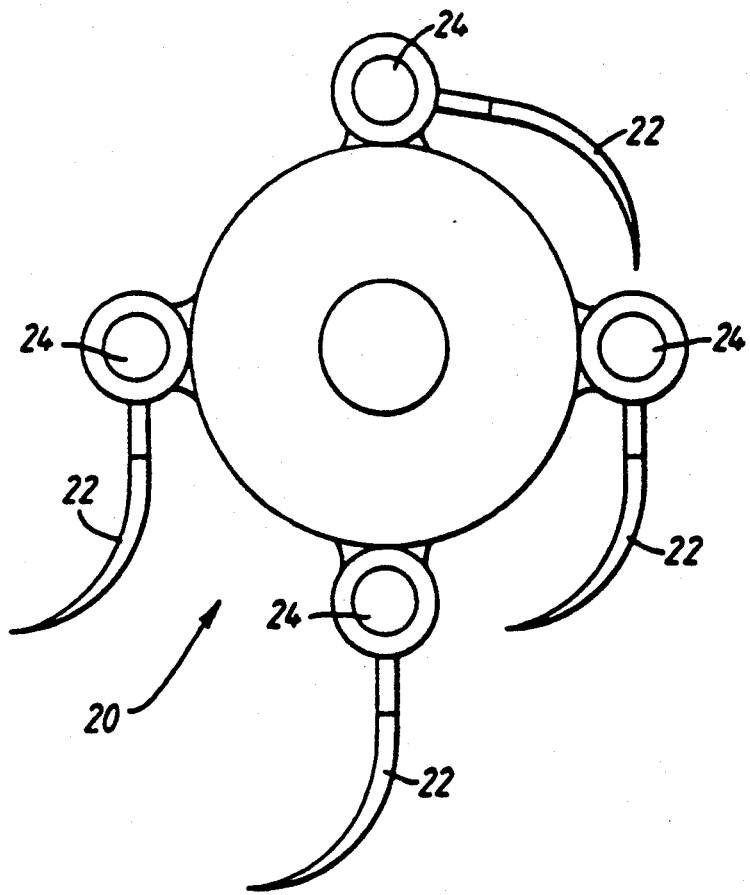
FIG. 4 is a schematic end elevation of a cutter drum.

The cutter drum 20 is enclosed within a housing comprising a part-cylindrical upper wall 30 which surrounds the upper portion of the drum and a part-cylindrical lower wall 32 which merges with a rectilinear inlet ramp 34 adjacent the lower end of the conveyor 4 (see FIG. 3). The front side of the housing is open to provide an inlet 36 which extends the length of the drum and which is defined from above by the lower edge of the part-cylindrical upper wall 30 and from below by the inlet ramp 34. The rear side of the housing is open in its lower portion to define an outlet 38 which extends the length of the drum and faces towards the inlet 36. The outlet 38 communicates with a removable discharge chute 40.

Figure 5A:
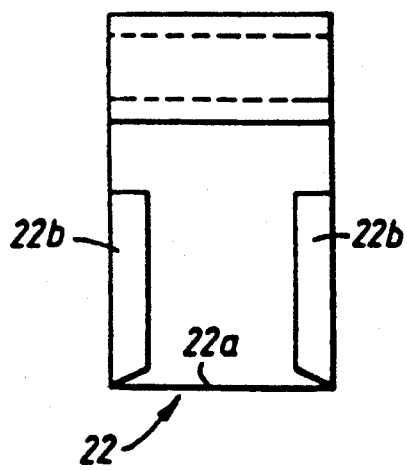
FIGS. 5A and 5B are schematic plan views of different forms of blade for the drum.
Figure 5B:
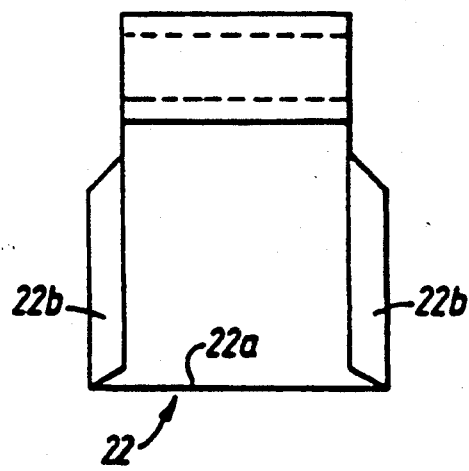

Each blade 22 is of approximately right-angled configuration as viewed in cross-section. This configuration enables each blade to generate a substantial air flow during rotation of the cutter drum. As shown in FIGS. 5A and 5B, each blade 22 is sharpened at its tip portion 22a and also along its lateral edges 22b. A fixed anvil bar 42 preferably of triangular section extends along the lower edge of the inlet 36 to the housing to co-operate with the tips of the rotating blades 22 to produce a shearing action on matter fed to the drum 20, the length of each blade 22 and the depth of the anvil bar 42 being such that there is a small clearance between the blade cips and the angle bar during rotation.

The device may be set up ro provide a relatively fine cut, or a coarser cut with particles of mixed length. To provide the fine cut a grill is mounted over the inlet 36 to the housing, the grill comprising a series of grill bars 44 each located between respective groups of blades 22; in this configuration, the blades used are the narrower blades as shown in FIG. 5A. To provide the coarser cut, the grill is removed and the wider blades shown in FIG. 5B are used.

A bale support member 50 is located above the housing to support the lower side of a bale. In the embodiment shown, the bale support member extends the length of the housing and is in the form of a roller mounted for rotation about an eccentric axis. The eccentric support roller 50 is driven in synchronism with the conveyor 4.

A bale to be peeled is loaded onto the device so that it it is supported on the conveyor 4 with its axis horizontal and transverse to the conveyor, and with the lower end of the bale resting against the eccentric support roller 50. The conveyor 4 is driven in the direction indicated by the arrows to peel the outer layer from the bale and to direct the peeled matter toward the inlet 36 of the cutter housing, this action of the conveyor 4 also causing rotation of the bale. The cutter drum 20 rotates ar high speed in the direction indicated to generate an intense air flow which draws the peeled matter into the lower part of the housing in which it is sheared-and chopped by the action of the rotating blades 22 and anvil bar 42. Any long particles which become wrapped around the blades will be cut by the sharpened lateral edges 22b of the blades. The cut particles are discharged through the outlet 38 by the combined effects of the forces imparted by the rotating blades 22 and the airflow generared by the blades 22. The airflow carries the particles along the discharge chure 40 for discharge into a bin or other receptacle.

During this action, the bale is resting against the eccentric roller 50. The eccentric rotation of the roller 50 causes the bale to move repeatedly from a position in which it lies closely adjacent to, or against, the cutter housing, and a position further from the cutter housing. This oscillating movement of the bale is of importance to the operation of the device as it periodically creates a substantial gap between the lower part of the bale and the cutter housing to facilitate the ingress of a large volume of air which is drawn into the inlet 36 of the housing by the rotating cutter drum. The oscillation also acts to briefly interrupt, or at least to substantially reduce, the flow of peeled matter to the cutter drum when the bale is furthest from the housing. These two effects prevent blockage of the cutter drum during operation and act to permit a regular, strong, discharge of comminuted matter. The eccentric roller 50 also acts to loosen the outer layer of the bale for subsequent peeling.

The direction of drive of the conveyor 4 and eccentric roller 50 may be reversed so that the bale is peeled, with discharge being from the top end of the conveyor without comminution by the cutter drum. In this mode, the device thus acts like a conventional bale peeler.

The device may be mounted in a frame for free-standing operation, for example in a barn. In this form, the device may include an electric drive motor with appropriate transmission to the cutter drum, conveyor belt and eccentric support roller.

However, in the preferred embodiment as illustrated, the device is mounted on a wheeled chassis 60 to be towed behind a tractor, the device being arranged laterally of the chassis whereby discharge occurs to one side via the discharge chute. Preferably, the chassis 60 also mounts a bale lifter 62, the lifter extending to the rear of the chassis so as to pick-up a bale and then load it into the device for peeling or for peeling and comminution. Alternatively, the device may be mounted as an attachment to the bale handler described in Australian patent application 40308/85 to which reference should be made for full details.

Figure 2:
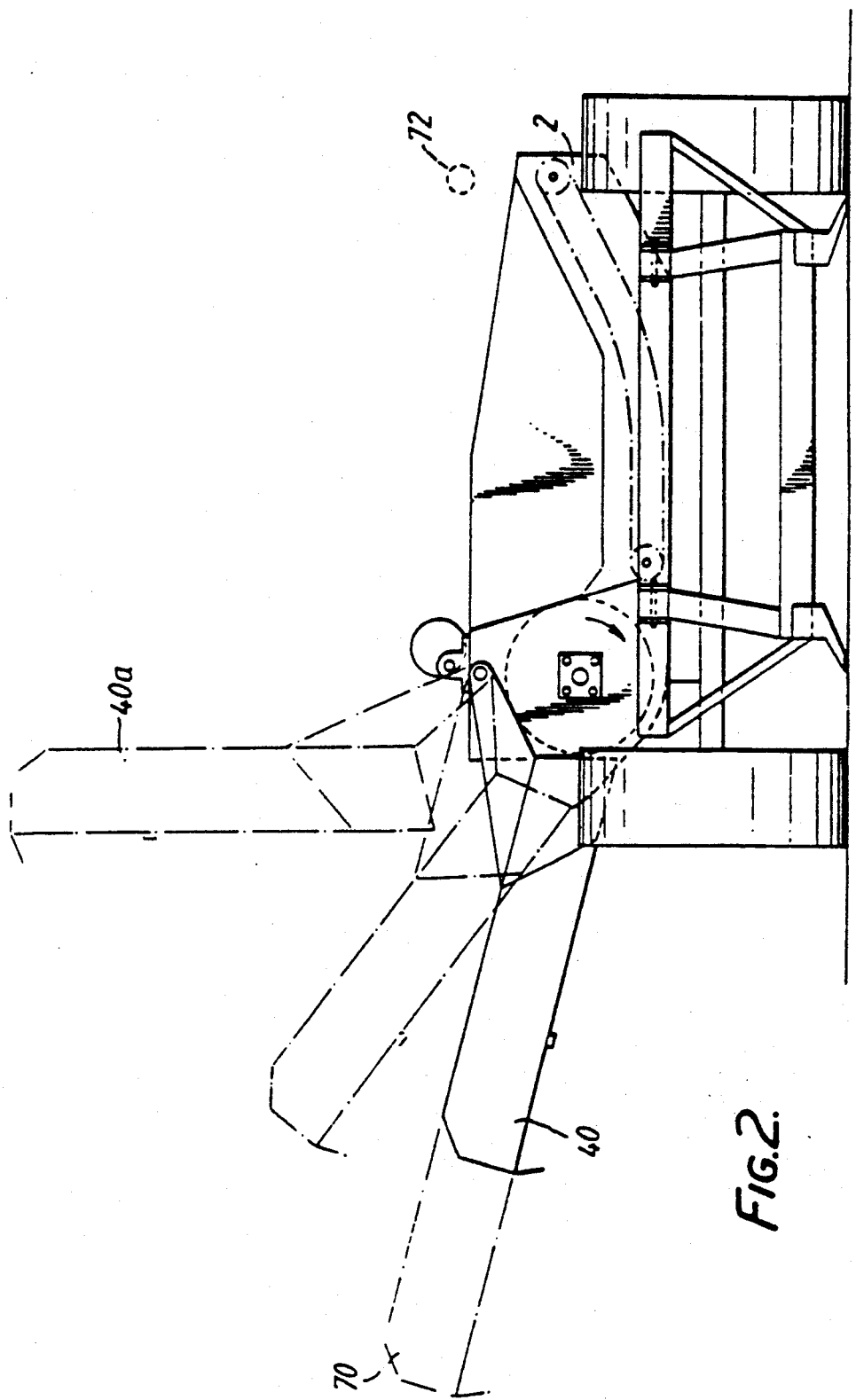
FIG. 2 is a schematic end elevation in the direction of arrow "A" in FIG. 1.

In the preferred embodiment, the device is powered from the PTO of the tractor. The cutter drum 20 is preferably directly driven via a mechanical drive transmission so as to rotate at a constant speed, for example up to 2000 r.p.m. The conveyor 4 and eccentric support roller 50 are driven in synchronism by a hydraulic motor which facilitates variation in their drive speed and also reversal of their directions of drive as discussed earlier. The discharge chute 40 is movable to an upright position (as shown at 40a in dotted lines in FIG. 2) for transport of the device on the open road. In the vertical position, the outlet 38 from the housing is directly exposed and the device can be operated to discharge comminuted matter substantially horizontally through the outlet whereby to form a layer for bedding purposes.

The chute 40 may be provided with suitable extension pieces 70, if required.

A retaining roller 72 (FIG. 2) may optionally be mounted on a suitable support above the upper end of the conveyor 4 to retain the bale in position even if the device is operating in a steeply sloping environment.

The device described herein operates to efficiently deliver large volumes of comminuted hay or other fodder peeled from a bale. The fodder is in contact with the cutter drum only over a relatively small proportion of its rotation (typically over an arc of about 60°) during movement of the fodder through the bottom part of the housing. This has the effect of reducing the overall power requirements and also obviates the comminution into very small particles which would have no value.

The embodiment has been described by way of example only and modifications may be made within the scope of the invention. For example, a further set of simple rectangular blades may be disposed one between each adjacent co-planar pair of flail blades 22. In another modification, provision may be made to bolt a screen across the interior of outlet 38. This screen may be arcuately contiguous and co-cylindrical with walls 30, 32 for trapping matter in the path of the blades until it is small enough to pass the screen.

I claim:

1. A device for chopping bales comprising rotary cutter means having cutting elements spaced in the direction of its axis of rotation, means for supporting and rotating a bale about an axis substantially parallel to that of the cutter means and to bias the bale towards the cutter means whereby to separate an outer layer from the bale and feed it to the cutter means, said cutter means when rotating inducing an air flow to draw matter removed from the bale into a zone of action of the cutter means for comminution and for subsequent discharge; and means for periodically moving the bale away from the cutter means to enhance airflow.

2. A chopping device comprising rotary cutter means having cutting elements spaced in the direction of its axis of rotation, said cutting elements projecting outwardly of the axis of rotation of the cutter means as the latter rotates, means for feeding matter to be chopped to the cutter means, and a grill defined by respective grill bars between adjacent projecting cutting elements, towards which grill said matter is fed to be chopped by the cutter means; and means for periodically moving the bale away from the cutter means to enhance airflow through the device.

3. A device for chopping bales, comprising rotary cutter means mounted for rotation about a substantially horizontal axis, means for supporting a bale with the lower part of the bale adjacent the cutter means and for tumbling or rotating the bale such that an outer layer is removed from the bale and is fed to the cutter means to be comminuted by the cutter means and discharged by the rotation of the cutter means, and means operative to move the bale further away from the cutter means, but to allow the bale to subsequently return towards the cutter means, said means comprising an eccentric roller which is rotatable to effect oscillating movement of the bale.

4. A device according to claim 3, wherein said supporting means is adapted to support a round bale with its axis substantially horizontal and to rotate the bale about said axis.

5. A device according to claim 4, wherein the means for supporting and rotating the bale comprises an endless conveyor on which the bale rests.

6. A device according to claim 3, wherein the means for supporting and rotating the bale comprises an endless conveyor on which the bale rests, the device further comprising means for driving the eccentric roller and conveyor in synchronism.

7. A device according to claim 6, comprising means for reversing the direction of the conveyor.

8. A device according to claim 3, wherein the cutter means is mounted within a housing having an inlet positioned to receive matter removed from the bale, and an outlet through which matter comminuted by the cutter means is discharged, said cutter means comprising means for generating an air flow to draw matter into the inlet and to discharge the comminuted matter through the outlet.

9. A device according to claim 8, wherein the means for supporting and rotating the bale comprises an endless conveyor on which the bale rests, the inlet is located at a discharge end of the conveyor and extends the width of the conveyor, and the rotating cutter means is co-extensive with the inlet and includes pivotal blades spaced in the direction of the axis of rotation of the cutter means, the blades being shaped to create the air flow.

10. A device according to claim 3, wherein said means operative to move the bale comprises a mechanism periodically operative to move the bale.

11. A device according to claim 8, wherein the outlet communicates with a discharge chute, said chute being movable to expose the outlet for direct discharge.

12. A device according to claim 8, wherien the cutter means comprises cutting elements shaped to generate the air flow, and the housing inlet includes a grill defined by a respective grill bar arranged between each pair of adjacent cutting elements.

13. A device according to claim 2, wherein the cutting elements comprise blades which are pivotal about axes parallel to the axis of rotation of the cutter means and cooperate with a fixed anvil during rotation.

14. A device according to claim 13, wherein the blades each have a sharpened tip and sharpened laterla edge directed transversely to the axis of rotation of the cutter means.

* * * * *